United States Patent [19]

Fischer

[11] Patent Number: 4,516,378
[45] Date of Patent: May 14, 1985

[54] ANCHORING DEVICE

[76] Inventor: Artur Fischer, Weinhalde 34, D-7244 Tumlingen Waldachtal 3, Fed. Rep. of Germany

[21] Appl. No.: 481,262

[22] Filed: Apr. 4, 1983

[30] Foreign Application Priority Data

Apr. 20, 1982 [DE] Fed. Rep. of Germany ....... 3214440

[51] Int. Cl.³ ................................................ E04C 5/12
[52] U.S. Cl. ..................................... 52/704; 411/28; 411/55
[58] Field of Search ................................. 52/704, 707; 411/15–18, 27, 28, 52–55

[56] References Cited

U.S. PATENT DOCUMENTS

| 527,406 | 10/1894 | Church | 411/28 |
| 683,082 | 9/1901 | Summerer | 411/28 |
| 3,082,657 | 3/1963 | Fischer . | |
| 3,277,623 | 10/1966 | Fischer . | |
| 3,524,379 | 8/1970 | Fischer . | |
| 3,815,467 | 6/1974 | Fischer . | |
| 4,050,346 | 9/1977 | Fischer . | |
| 4,065,996 | 3/1978 | Fischer . | |
| 4,094,054 | 6/1978 | Fischer . | |
| 4,094,223 | 6/1978 | Fischer . | |
| 4,182,091 | 1/1980 | Fischer . | |
| 4,287,807 | 9/1981 | Pacharis | 411/55 |

FOREIGN PATENT DOCUMENTS

| 1197234 | 6/1959 | France | 411/55 |
| 2360007 | 2/1978 | France | 411/54 |

Primary Examiner—James L. Ridgill, Jr.
Attorney, Agent, or Firm—Michael J. Striker

[57] ABSTRACT

The anchoring device for anchoring in a hole formed in a porous structural material includes an expansible sleeve-shaped member formed with elongated slots, an expandable conical member and an intermediate expandable element which is slotted and positioned between the sleeve-shaped member and the expandable member. Upon inserting and rotating an actuation screw into the sleeve-shaped member, intermediate element and expandable conical member they are expanded and anchored in the hole of the porous material.

11 Claims, 2 Drawing Figures

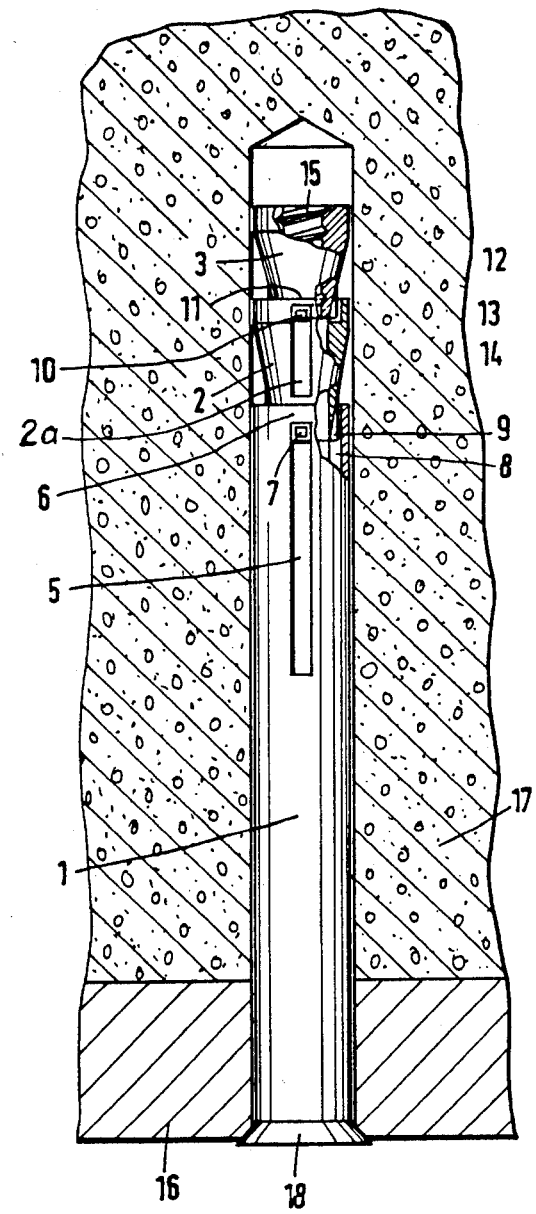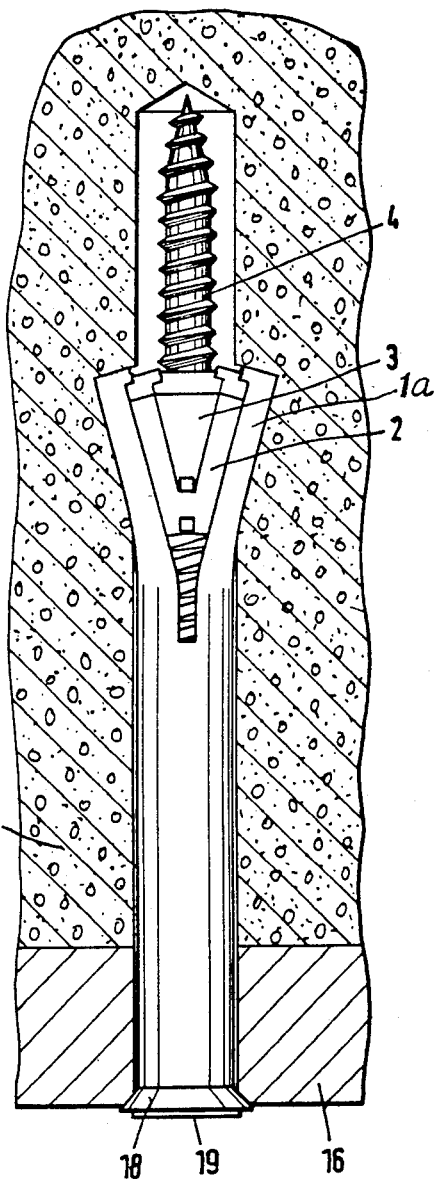

ANCHORING DEVICE

BACKGROUND OF THE INVENTION

The present invention relates to an anchoring device used for fastening an object to a supporting structure. More specifically, the invention relates to an anchoring device for anchoring in porous construction materials, particularly aerated cement and hollow structural blocks.

Known anchoring devices or expansion dowels of the type under consideration comprise a slotted expansion sleeve provided with an expandable member having an expansion cone, which is movable in the axial direction of the sleeve by means of a screw.

Anchoring devides of the type under discussion are disclosed, for example, in the applicant's U.S. Pat. Nos. 3,277,623; 3,082,657; 3,524,379; 3,815,467; 4,094,054; 4,094,223; 4,182,091; 4,065,996 and 4,050,346.

Expansion dowels known in the art are usually utilized for anchoring in hard solid construction materials in which, in order to achieve effective anchoring, relatively small expansion is required. If such elements are to be inserted in porous construction materials, such as aerated cement or hollow construction block, it is necessary to use, due to insignificant expansion abilities of known expansion dowels, the expansion sleeve of the double wall thickness as compared to that which is normally used, in order to provide only relatively small holding or anchoring forces.

Since the wall thickness of the expansion sleeve defines the expansion quality of the anchoring device there have been suggested special dowels of very large outer diameters for porous construction materials. The utilization of such dowels, however, caused difficulties during the assembly and required that a hole, which is usually formed in masonry or supporting structure to receive the expansion dowel therein, would be also of a larger diameter as well as the diameter of the fastening or actuating screw which is inserted into the dowel. Frequently, however bores or holes for fastening objects to the supporting structure, such as masonry, are preliminarily made in the masonry; these bores do not allow, however, drilling of holes of larger diameters to receive expansion sleeves of larger diameters therein.

SUMMARY OF THE INVENTION

It is an object of the invention to provide an improved anchoring device.

It is another object of the invention to provide an anchoring device which ensures an intensive expansion of the device in porous construction materials without increasing diameters of the components of the anchoring device.

These and other objects of the invention are attained by an anchoring device for mounting an object to a supporting structure of porous construction materials, particularly aerated cement or hollow structural blocks, comprising an expansible sleeve-shaped member adapted to be received and anchored in a hole formed in the structure, said sleeve-shaped member having a front end remote from said object and having elongated slots; an expandable member having a conical outer face portion; an actuating screw insertable into said sleeve-shaped member and said expandable member to cause the movement of said expandable member in an axial direction of the sleeve upon rotation of said actuating screw; and at least one intermediate expandable element with an internal thread to receive said actuating screw therethrough and positioned between the front end of the sleeve-shaped member and said expandable member and having a conical outer face portion.

The intermediate element has a front end remote from the sleeve-shaped member and may be formed with elongated slots extended from its front end over a portion of its length.

Due to the provision of at least one intermediate expandable element between the slotted sleeve and the expandable conical member the expansion capability of the anchoring device will be considerably improved without increasing the outer diameter and the wall thickness of the expansion sleeve. Furthermore, the hole customarily made for solid construction materials should be only somewhat deeper in order to be used for the anchoring device according to the invention. The utilization of the anchoring device of the invention in hollow structural blocks will result in high holding values of the expansion components of the device inserted in the hole in the region of the cross-piece of the hollow structural block, and also in expansion and bulb-formation behind the cross-piece of the hollow structural block.

According to a still further feature of the invention the angle of inclination of the conical outer face portion of the intermediate element may be smaller than the angle of inclination of the conical outer face portion of the expandable member. This provides for a high entry resistance for the expandable member because first the intermediate element is pulled into the expansion sleeve by the actuating screw and the slotted sleeve expands. When the respective expansion pressure exceeds the resistance by the material of the supporting structure the expandable member is then drawn into the inner hole of the intermediate expandable element and thereby a further expansion of the slotted sleeve is performed.

According to a still further embodiment of the invention the sleeve-shaped member may be formed with two opposite internal elongated grooves and has a plane through which the slots formed therein extend, the grooves being offset 90° relative to the plane of the slots. The intermediate expandable element may be formed with two projections on the outer periphery thereof, said projections being engaged in said grooves, respectively. This arrangement ensures protection against torsional rotation of the intermediate expandable element relative to the expandable member and the projections remain in engagement with the grooves even when very strong expansion takes place.

According to a still further feature of the invention the intermediate element may be formed with two recesses which are opposite to each other with respect to an axis thereof and are offset 90° relative to the plane of the slots therein. The expandable member may be formed with two projections which are engaged in said recesses, respectively. Due to the limiting of the recesses relative to the sleeve-shaped member even large resistance by the material of the supporting structure is overcome so that it is always ensured that first, the intermediate expandable element is pulled into the sleeve-shaped member and only then, when higher resistance occurs, the expandable member is additionally drawn into the intermediate expandable element.

According to another features of the invention the slots in the sleeve-shaped member may form expandable leg portions which are held together before expansion by a bind provided in the region of the front end of the sleeve-shaped member.

Furthermore, the slots in the intermediate element may form expandable leg portions which are held together before expansion by a bind provided in the region of the front end of the intermediate element. Due to the above noted features of the invention a preliminary expansion of the components of the anchoring device is prevented from occurring.

The intermediate member may be formed with pins radially outwardly extended therefrom and engageable in the respective slots of the sleeve-shaped member.

The expandable member may be formed with pins radially outwardly extended therefrom and engageable in the respective slots of the intermediate element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a view partially in section, of the anchoring device according to the invention, in the non-expanded condition; and FIG. 2 is a view of the anchoring device of FIG. 1 but in the expanded condition.

DETAILED DESCRIPTION OF THE PREFERRED EMBODIMENTS

Referring now to the drawings, the anchoring device according to the invention comprises an elongated expansion sleeve 1 which passes a bore formed in an object 16 and is inserted into a hole provided in a porous material, such as masonry identified as 17, an expandable element 2 having an expansion outer conical surface and an expandable member or body 3 also having an expansion outer conical surface. The expansion sleeve 1, expandable element 2 and expandable member 3 each is formed with a central bore into which a threaded portion of a screw 4 is introduced. Screw 4 is an expander or actuating member. Screw 4 is extended through the central bore of sleeve 1, element 2 and member 3 and meshes with screw thread provided therein. When screw 4 is rotated the expandable element 2 and expandable member 3 will be displaced in the axial direction such that the expandable element 2 will be drawn deeper into the central bore of sleeve 2 whereas the expandable member 3 will be drawn deeper into the expandable element 2.

Sleeve 1 is formed with opposite slots 5 which form expandable leg portions 1a of the sleeve 1. Slot 5 extend downwardly from the front end of the sleeve. Expandable leg portions 1a are held together against preliminary expansion by a bind 6. The expansion element 2 is connected to the sleeve 1 by means of a lock formed by pins 7 made on the outer periphery of element 2, which pins are inserted into respective slots 5 whereby during the rotation of actuating screw 4 expandable element 2 can not be separated from sleeve 1 and lost. Expandable element 2 is formed with an inner bore 14 into which the expandable member 3 is pulled during the expansion as will be explained below.

Sleeve 1 is further provided with two longitudinal internal grooves 8 which are offset 90° to the plane of the slots and are opposite to each other with respect to the slots. The expandable element 2 is in turn provided with two projections 9 engaged in the grooves 8, respectively. Projections 9, on the one hand, ensure protection against torsion between the expandable element 2 and the sleeve 1 and, on the other hand, ensure that the slotted arrangement of the element 2 is positioned in the same plane as the slotted arrangement of sleeve 1. Thereby uniform expansion directions are provided for the element 2 and sleeve 1.

The expandable member 3 as well as the intermediate element 2 has a conical outer face portion. The angle of inclination of the conical face portion of element 2 is smaller than the angle of inclination of the conical outer face portion of member 3.

The expandable member 3 is held in the element 2 by means of pins 10 which are engaged in respective slots 2a formed in the expandable element 2. Slots 2a extend downwardly from the front end of element 2. The protection against torsion or rotation between the element 2 and member 3 is achieved by means of two recesses 13 formed in the element 2 so that they are offset 90° relative to the plane of slots 2a, and projections 12 formed at the edge portion of member 3, which projections are engaged in recesses 13. The limiting of recesses 13 in the direction of elongation of sleeve 1 results in an overcoming entry stop action if high resistance of the material occurs. The arrangement of recesses 13 ensures that first, the element 2 is drawn into sleeve 1 and only then the expandable member 3 is pulled into the element 2 as the screw 4 is rotated.

Due to this slide-in movement of one component of the anchoring device into another, upon the insertion and rotation of the screw 4 in the thread 15 of member 3, a very effective and intensive expansion of the anchoring device is achieved which permits the utilization of this device in porous construction materials, such as aerated cement and hollow structural blocks, and the intensive expansion can be obtained by respective constructions of counter bearings for high holding values.

Sleeve 1 is expanded until the leg portions 1a thereof are in anchoring engagement with the material surrounding the hole in supporting structure 17.

The fastening of the object 16 to the masonry 17 is obtained by a flange 18 of the sleeve and the head 19 of screw 4 engaged in the countersink of flange 18.

It will be understood that each of the elements described above, or two or more together, may also find a useful application in other types of anchoring devices differing from the types described above.

While the invention has been illustrated and described as embodied in an anchoring device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An anchoring device for mounting an object to a supporting structure of porous construction materials, particularly aerated cement or hollow structural blocks, comprising an expansible sleeve-shaped member adapted to be received and anchored in a hole formed in the structure, said sleeve-shaped member having a front end remote from said object and being formed with elongated slots; an expandable member having a conical outer face portion; an actuating screw insertable into said sleeve-shaped member and said expandable member to cause the movement of said expandable member in an axial direction of the sleeve upon rotation of said actuating screw; and at least one intermediate expandable element with an internal thread to receive said actuating screw therethrough and positioned between the front end of the sleeve-shaped member and said expandable member and having a conical outer face portion, said intermediate element having a front end remote from said sleeve-shaped member and being formed with elongated slots extended from its front end over a portion of its length, said intermediate element being further formed with locking pins radially outwardly extended therefrom and engageable in the respective elongated slots of said sleeve-shaped member.

2. The device as defined in claim 1, wherein said expandable member is formed with locking pins radially outwardly extended therefrom and engageable in the respective slots of the intermediate element.

3. The device as defined in claim 2, wherein said intermediate element has a plane through which the slots formed therein extend, the intermediate element being formed with two recesses which are opposite to each other with respect to an axis of the intermediate element and are offset 90° relative to said plane.

4. The device as defined in claim 3, wherein said expandable member has an outer periphery and is formed with two projections which are engaged in said recesses, respectively.

5. The device as defined in claim 2, wherein said slots in said sleeve-shaped member form expandable leg portions which are held together before expansion by a bind provided in the region of the front end of the sleeve-shaped member.

6. The device as defined in claim 5, wherein the slots in said intermediate element form expandable leg portions which are held together before expansion by a bind provided in the region of the front end of the intermediate element.

7. The device as defined in claim 2, wherein the angle of inclination of the conical outer face portion of said intermediate element is smaller than the angle of inclination of the conical outer face portion of said expandable member.

8. The device as defined in claim 2, wherein said sleeve-shaped member is formed with two opposite internal elongated grooves and has a plane through which the slots formed therein extend, said grooves being offset 90° relative to said plane.

9. The device as defined in claim 8, wherein said intermediate element has an outer periphery and is formed with two projections on said outer periphery, said projections being engaged in said grooves, respectively.

10. The device as defined in claim 9, wherein said intermediate element has a plane through which slots formed therein extend; the intermediate element being formed with two recesses which are opposite to each other with respect to an axis of the intermediate element and are offset 90° relative to said plane of the intermediate element.

11. The device as defined in claim 10, wherein said expandable member has an outer periphery and is formed with two projections which are engaged in said recesses, respectively.

* * * * *